United States Patent

[11] 3,598,897

[72] Inventor William Castic
Elkgrove Village, Ill.
[21] Appl. No. 850,095
[22] Filed Aug. 14, 1969
[45] Patented Aug. 10, 1971
[73] Assignee The Pyle-National Company
Chicago, Ill.

[54] CONDUIT FITTING FOR PENDENT LIGHT FIXTURES
17 Claims, 7 Drawing Figs.

[52] U.S. Cl. .................................................. 174/61,
174/48, 220/3.94
[51] Int. Cl. ....................................................... H02b 1/08
[50] Field of Search............................................ 174/48, 49,
61, 62, 63, 64, DIG. 2; 220/3.92, 3.94, 4; 240/52,
52.1, 78; 248/343

[56] References Cited
UNITED STATES PATENTS
2,368,619 2/1945 Soderberg..................... 220/3.94 UX
3,123,310 3/1964 Dameral.......................... 174/63 X Primary Examiner—Lewis H. Myers
Assistant Examiner—D. A. Tone
Attorney—Hill, Sherman, Meroni, Gross & Simpson ABSTRACT: A conduit fitting for attaching pendent light fixtures to an overhead conduit line comprises first and second members respectively attachable to the conduit line and the fixture, wherein the members have complemental mating tongue and groove portions enabling convenient sliding assembly of the members for positively securing the fixtures to the conduit line. Removable cover members selectively close open ends of the grooves to restrain relative movement between the members and provide selective access to a wiring compartment formed between the members for permitting inspection of electrical wiring connections.

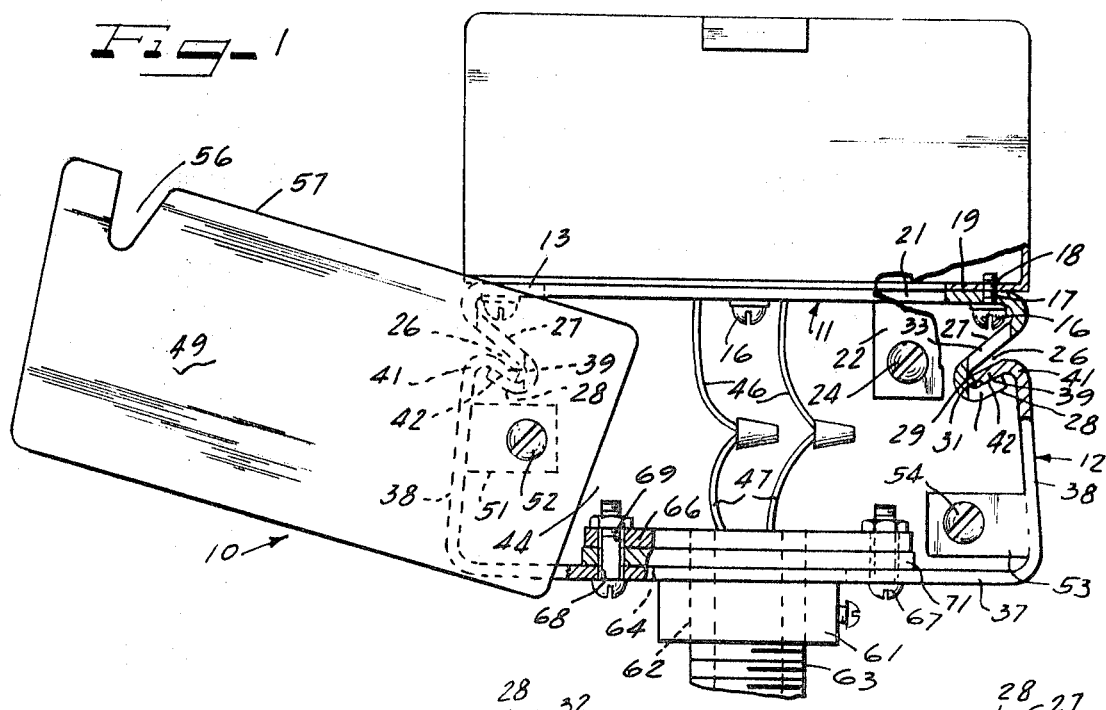
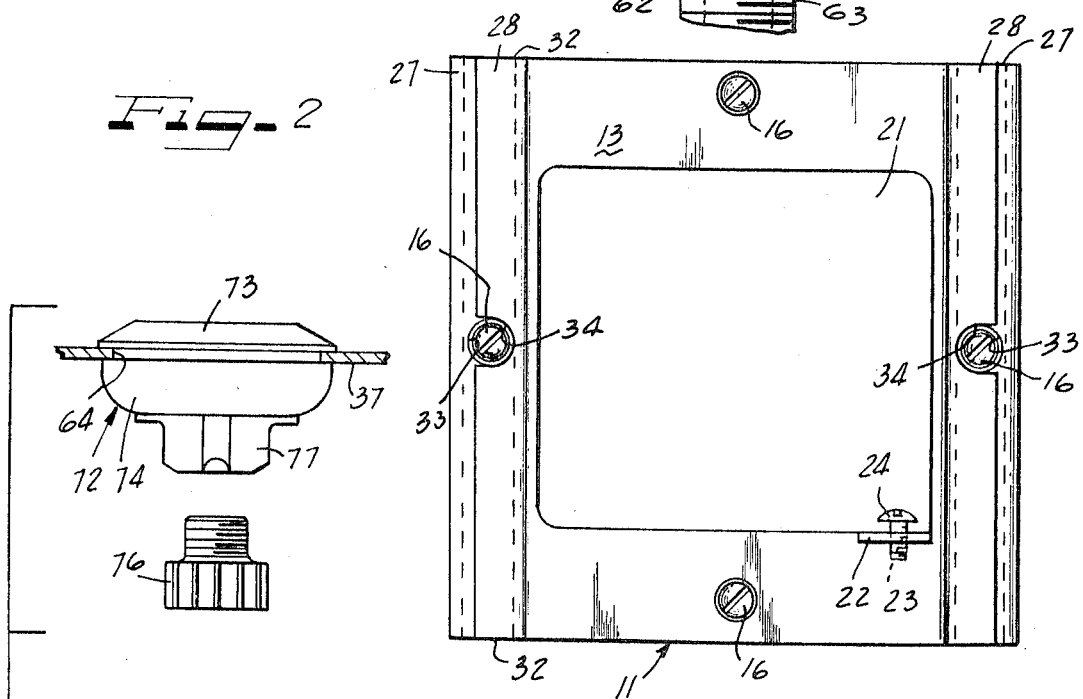

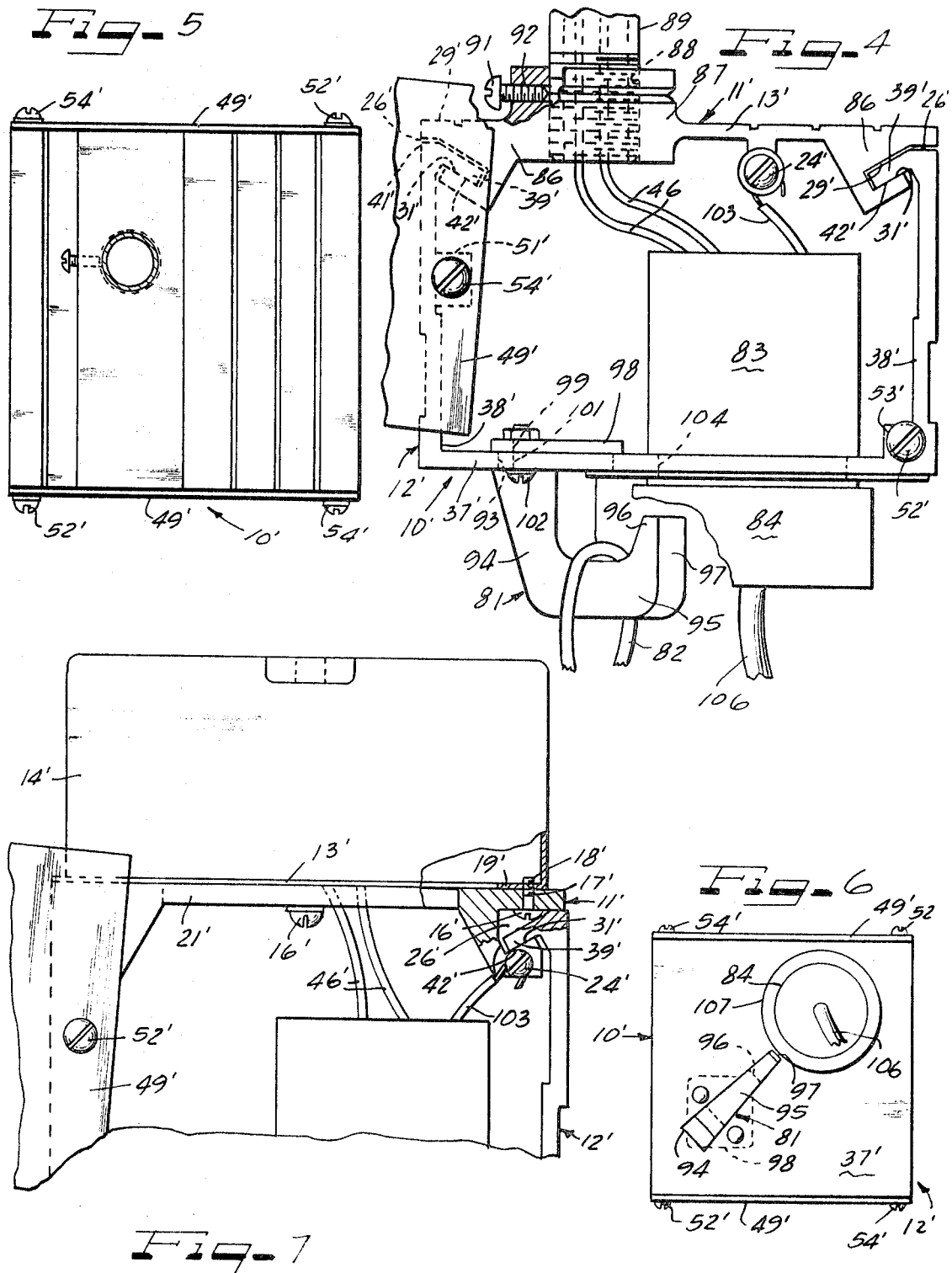

3,598,897

CONDUIT FITTING FOR PENDENT LIGHT FIXTURES

BACKGROUND OF THE INVENTION

1. Field of the Invention

The present invention relates generally to 1. conduit fittings, and more particularly refers to an electrical conduit fitting for attaching pendent light fixtures to a building or architectural structure having an overhead conduit line.

2. Description of the Prior Art

In illuminating interiors of high bay industrial plant buildings or other commercial buildings it is common practice to string an overhead conduit line and provide junction boxes or depending, threaded nipples longitudinally spaced along the conduit at spacings in accordance with the desired number of fixtures and the lighting requirements of the area. Heretofore, pendent light fixtures have been directly attached to the conduit line by various means, for example, by directly threading the fixture onto a depending threaded nipple or by fastening the fixture with screws to an adapter plate carried on the junction boxes.

Recently pendent light fixtures of the mercury vapor type have come into wide spread use, and those fixtures include a mercury vapor ballast weighing in the range of 20 to 50 pounds and disposed within a fixture enclosure. Thus, that type of fixture is very difficult to handle and manipulate when installers or maintenance personnel are required to thread the fixture onto an overhead conduit line while perched on a ladder or scaffolding, and is particularly difficult when the conduit line is in a high bay area.

Further, once the pendent fixture is attached, inspection of electrical wiring connections or splices have been difficult and often times required removal of the fixture.

SUMMARY OF THE INVENTION

In accordance with the principles of the present invention, a conduit fitting for attaching pendent light fixtures to an overhead conduit line comprises first and second members respectively attachable to the conduit line and the fixture and is characterized by complemental mating groove and tongue portions, thereby enabling convenient sliding assembly or attachment of the fixture to the conduit line. Further, the first and second members are arranged to form a wiring compartment therebetween permitting access to electrical leads extending from both the conduit line and the fixture for conveniently forming electrical connections or splices and permitting inspection of the same without requiring removal of the fixture.

Removable cover members selectively cover the wiring compartment and close open ends of the groove portions to restrain relative movement between the members.

In particular, the first member comprises a substantially rectangular plate portion characterized by means forming a pair of laterally outwardly opening grooves or slots extending transversely along opposite side edge portions of the plate and having opposite ends thereof open to permit slidingly inserting tongue portions formed on the second member. The pair of grooves or slots have a channel-shaped configuration forming a pair of confronting, parallel sidewalls and are disposed along a pair of converging planes formed obliquely to and slanting inwardly of the rectangular plate portion.

In order to provide the wiring compartment, the second member has a substantially channel-shaped configuration characterized by a rectangular, planar medial portion and a pair of upstanding sidewalls disposed at opposite side edges of the medial portion. The tongue portions for mating with the grooves of the first member are formed along upper terminal edges of the upstanding sidewalls and comprise a pair of flanges formed obliquely to the sidewalls and slanting downwardly and inwardly of the channel shaped member, thereby forming a pair of tongue portions configured complementarily with the grooves or slots on the first member.

A pair of cover members normally cover the opposite open ends of the box like wiring compartment defined between the assembled members and are pivotally carried on the channel-shaped second member to be selectively movable to a position enabling access to the wiring compartment. Further, in a normal closed position, the cover members cover opposed, open ends of the grooves or slots formed in the first member, thereby restraining relative movement between the members and thus securing the light fixture in assembled relationship with the conduit line.

It is contemplated by the present invention to provide various means for attaching the first and second members respectively to the conduit line and the pendent light fixture. In one embodiment a plurality of attachment apertures are formed in the first member and arranged to be aligned with threaded apertures provided in a junction box for receiving appropriate fastening means, such as screws. Alternatively, the first member may include a hub portion having a threaded through bore for threadingly receiving a nipple depending from the conduit line.

Means for attaching the second member to the pendent light fixture may include a hub portion received within an appropriately configured aperture in the planar medial portion of the second member and having a threaded throughbore for threadingly engaging an upstanding nipple secured to the light fixture. A vibration dampening, resilient gasket may be interposed between a radially extending flange on the hub portion and the planar medial portion of the second member, thereby isolating the light fixture from building vibrations. When the conduit fitting of the present invention is utilized with a conduit line secured along a slanted ceiling, the hub portion may be substituted by a ball and socket swivel joint for permitting vertical placement of the pendent light fixture.

Further, it is contemplated by the present invention to provide an electrical receptacle carried in the second member and a hook means for receiving a loop secured to the light fixture. The hook is so positioned relative to the receptacle that with an appropriate electrical plug inserted into the receptacle, the loop may not be removed from the hook means, thereby providing a fail safe system requiring removal of the plug from the receptacle prior to removing the supporting loop from the hook means.

BRIEF DESCRIPTION OF THE DRAWINGS

FIG. 1 is an end elevational view, partly in section, illustrating a conduit fitting for attaching a pendent light fixture to an overhead conduit line and embodying the features of the present invention;

FIG. 2 is a bottom plan view of a first or upper member of the conduit fitting illustrated in FIG. 1;

FIG. 3 is a fragmentary end elevational view of an alternative embodiment of the conduit fitting shown in FIG. 1;

FIG. 4 is an end elevational view, partly in section, illustrating an alternative embodiment of a conduit fitting constructed in accordance with the present invention;

FIG. 5 is a reduced top plan view of the conduit fitting illustrated in FIG. 4;

FIG. 6 is a reduced bottom plan view of the conduit fitting illustrated in FIG. 4; and FIG. 7 is a fragmentary end elevational view similar to FIG. 4 and illustrating a further embodiment of the present invention.

DETAILED DESCRIPTION OF THE PREFERRED EMBODIMENTS

Referring to the drawings, a conduit fitting 10, constructed in accordance with the present invention, for attaching pendent light fixture to an overhead or ceiling supported conduit line comprises a first or upper member 11 attachable to the conduit line and a second or lower member 12 attachable to the pendent light fixture. The upper and lower members 11 and 12 have means forming complemental mating tongue and groove portions, thereby to permit convenient sliding engagement of the members for securing pendent light fixtures to the overhead conduit line.

In accordance with one embodiment of the present invention, as illustrated in FIGS. 1 through 3, inclusive, the first or upper member 11 comprises a stamped, sheet-form member having a planar, rectangular body or medial portion 13 sized and configured to form a cover member for an electrical junction box 14, which in turn is secured by appropriate means to the overhead or ceiling supported conduit line. Attachment means for securing the upper member 11 to the junction box 14, and thus to the overhead conduit line, comprise a plurality of fasteners, such as screws 16, received through apertures 17 formed in the body portion 13 and threadingly engaged into internally threaded apertures as at 18 extending through inturned flanges 19 formed on the junction box. The medial portion 13 of the first member 11 is also characterized by a central, rectangular cut out or access opening 21, for providing a large passageway through which lead wires from the conduit line may extend. If desired, a depending tab 22 characterized by a threaded aperture 23 for receiving a screw 24 may be provided at a periphery of the cut out 21 for use as a ground connection.

Means forming a pair of laterally oppositely opening grooves 26, 26 extending transversely along opposite side edge portions of the body or medial portion 13 comprise a pair of depending flanges 27, 27, each characterized by a reverse or return flange as at 28 extending along a lower terminal edge thereof. Each of the pair of flanges 27, 27 slants obliquely to, and inwardly of, the planar body portion 13 and respectively lie in a pair of planes converging toward a point beneath a plane containing the planar body and equally slanted downwardly thereof.

The return flanges 28, 28 project upwardly and outwardly from a lower terminal edge of the flanges 27, 27 and are disposed substantially parallel to and spaced from the depending flanges, thereby to form a pair of substantially parallel wall surfaces as at 29 and 31 respectively formed on the depending flange 27 and the return flange 28 and defining the upwardly and laterally outwardly opening grooves 26, 26. Opposite end portions as at 32, 32 of the grooves 26 are open to permit sliding engagement thereinto of appropriately formed tongue portions carried on the lower member 12 for enabling convenient sliding attachment of the lower member 12 to the upper member 11.

In order to provide tool access to the fasteners or screws 16, 16 disposed above the pairs of groove forming flanges 27 and 28, an aperture as at 33 and a notch as at 34 are respectively formed in the depending flanges and the return flanges in alignment with the apertures 17 formed in the body portion for receiving the fasteners 16.

Also, in accordance with the principles of the present invention, the second or lower member 12 comprises a stamped, sheet-form member characterized by a channel-shaped configuration in transverse cross section and having a planar, rectangular medial portion 37 sized to be coterminous with the planar, rectangular medial or body portion 13 of the first member 11 and a pair of substantially upstanding sidewalls 38, 38 extending transversely along opposite side edge portions of the medial section. Means forming complementally configured tongue portions for engaging the laterally opening pair of grooves 26, 26 comprise a pair of inturned flanges 39, 39 are slanted inwardly and downwardly of the channel shaped lower member 12 and lie along a pair of downwardly converging planes disposed parallel with the pair of converging planes containing the return flanges 28 defining the pair of grooves 26. An inward extent of each of the tongue forming flanges 39 is sized relative to the depending flanges 27 and the return flanges 28 so that the tongue forming flanges 27 and the return flanges 28 so that the tongue forming flanges may be slidingly inserted into the grooves 26 with lower side surfaces as at 42 of the flanges 39 overlapping the sidewalls 31 of the grooves 26. In that manner, the sidewalls 31 of the grooves 26 provide load bearing surfaces supporting the tongue forming flanges 39, and thus, supporting the lower member 12 and a pendent light fixture attached thereto.

With the flanges 39 slidingly engaged into the grooves 26, the medial section 37 of the lower member 12 is spaced beneath and disposed parallel to the body portion 13 of the upper member 11, and the upstanding sidewalls 38 extend between the medial section 37 and body portion 13, thereby to form a box like wiring compartment 44 opened at opposite ends for receiving lead wires as at 46 and 47 respectively extending downwardly from the junction box 14 through the access opening 21 and upwardly from a light fixture attached to the lower member. The wires 46 may be appropriately spliced to the wires 47 within the wiring compartment 44 and such splices may be inspected while the pendent light fixtures are supported by the overhead conduit line, thereby eliminating any necessity of manually supporting the pendent light fixture from the overhead conduit line to inspect the splices.

In order to enclose the wiring compartment 44 and cover the opposite open ends 32, 32 of the grooves 26 for restraining relative movement between the upper and lower members, a pair of covers is at 49 are attached to the lower member 12 at opposite ends thereof. The covers 49 are sheet-form members having a planar, substantially rectangular configuration sized to be coterminous with vertical and horizontal extents of the upper member 11 and lower member 12 when the conduit fitting is properly assembled.

Extending inwardly of one of the sidewalls 38 is a first support tab 51 characterized by a threaded aperture for receiving a screw 52 which passes through a clearance aperture formed in the cover 49, thereby to pivotally attach the cover 49 to the lower member 12. A second tab 53 extends inwardly of an opposite one of the lower member sidewalls 38 and is also characterized by a threaded aperture for receiving a screw 54. A notch 56 extending inwardly of a lower edge 57 of the cover 49 is positioned transversely along the cover to fit over the screw 54 whenever the cover is pivoted in a clockwise direction. Thus, the screw 52 provides a pivot axis about which the cover 49 may be selectively pivoted from a normal closed position, wherein the cover encloses the wiring compartment 44 and closes the open ends 32 of the grooves 26, and an open position, wherein the cover member is free of the groove open ends 32.

As illustrated in FIG. 1, one form of attachment means for securing the second or lower member 12 to a pendent light fixture comprises a hub portion 61 attached to the medial section 37 and having a threaded throughbore 62 for threadingly receiving a hollow conduit nipple 63 extending upwardly from the pendent light fixture. The hub 61 is received within a centrally disposed aperture 64 formed in the lower member medial section 37 and has a radially extending flange 66 disposed within the wiring compartment 44 and overlying the medial section 37. Nut and bolt assemblies as at 67 pass through aligned apertures as it 68 and 69 respectively formed in the medial section 37 and the radially extending flange 66, thereby to clamp the hub portion 61 to the lower member 12. If desired, a vibration absorbing, resilient gasket member 71 may be interposed between the medial section 37 and the radially extending flange 66 for isolating the pendent light fixture from building vibrations.

It is also contemplated by the present invention that the hub portion 61 may be replaced by a ball and socket swivel joint 72, as illustrated in FIG. 3. In that embodiment of the present invention, upper and lower members 73 and 74, respectively, form the swivel joint housing and clamp the lower member medial section 37 there between to secure the swivel joint to the lower member. A coupling member 76 threadingly engages a swivel mounted hub 77 for attaching the pendent light fixture to the lower member 12. With this form of the present invention, the pendent light fixtures may be hung in a vertical disposition even through the conduit line is secured to a slanted and with the junction boxes 14 extending obliquely to a horizontal plane.

An alternative embodiment of the present invention, as illustrated in FIGS. 4 through 7, inclusive, contemplates forming upper and lower members 11' by 12' respectively of the conduit fitting 10' from extruded sections and providing a hook portion 81, for receiving a supporting loop 82 attached to a pendent light fixture, and a power receptacle 83, for receiving a plug 84 electrically connected to the light fixture. In most other respects, the conduit fitting 10' is identical to the fitting 10, as illustrated in FIGS. 1 through 3, inclusive and as described hereinabove, so like parts are identified with like reference numerals to which a prime has been added.

Means forming the pair of laterally, oppositely opening and upwardly extending grooves 26'26' comprise a pair of offset rib portions 86, 86 formed integrally with the planar body portion 13' and characterized by longitudinally extending slots having parallel, confronting sidewall portions 29' and 31' defining the grooves 26' for slidingly receiving the tongue forming flanges 39' carried on the lower member 12'.

Extending along the body portion 13' parallel with the grooves 26' is a thickened rib portion 87 characterized by a vertically extending, threaded aperture 88 for receiving a hollow, threaded nipple 89 depending vertically from the overhead conduit line, thereby to provide means for attaching the upper member 11' to the conduit line. Further, a set screw 91 received in a threaded aperture 92 formed in the rib 87 and intersecting the aperture 88 engages the nipple 89 to restrain the same against rotational movement.

As illustrated in FIG. 7, if desired, the extruded section forming the upper member 11' may have a punched-out access opening 21' and appropriately arranged clearance apertures 17' for receiving screw fasteners 16' threadingly engaging apertures 18' formed inturned flanges 19' on a junction box 14' secured to the conduit line, thereby to permit attachment of the extruded form of the present invention to a junction box.

The hook member 81 is received in an appropriately formed aperture 93 formed through the medial section 37' of the lower member 12' and comprises a shank portion 94 terminating in an upwardly opening hook portion 95 characterized by an upstanding tip 96 having a planar outer surface 97 disposed adjacent the receptacle 83. Situated at an upper end portion of the shank 94 and overlying the medial section 37' is a substantially rectangular attachment flange 98 formed integrally with the hook member 81 and having a pair of diagonally disposed apertures as at 99 in alignment with a pair of apertures as at 101 formed in the medial section 37. A pair of nut and bolt assemblies as at 102 are received within the aligned apertures 99 and 101 for securely attaching the hook member 81 to the lower conduit fitting member 12'.

The power receptacle 83 has the lead wires 47' extending from the overhead conduit electrically connected thereto as well as a ground lead 103 which is clamped to the upper member 12' by the screw 24'. An appropriately formed aperture 104 extending through the medial section 37' receives the power receptacle 83 which is securely clamped to the lower member 12'. Prongs carried by the plug 84 may be fittingly inserted into appropriately configured openings formed in the power receptacle 83, and the prongs are connected to leads 106 which, in turn, are electrically connected to the light fixture.

As best illustrated in FIG. 6, the hook member 81 is disposed substantially diagonally across the rectangular medial section 37' of the lower member 12' with the outer tip surface 97 disposed adjacent an outer cylindrical surface 107 of the plug member 84 when the same is inserted into the power receptacle 83. Further, the hook member 81 is sized and positioned so that substantially no space remains between the tip outer surface 94 and the plug cylindrical outer surface 107 whenever the plug is inserted into the power receptacle 83, thereby to prevent removal of the supporting loop 82 from the hook member 81 unless the plug 84 is first removed from the power receptacle 83. In that manner, a fail safe system is provided for eliminating inadvertent damage to the power receptacle 83, plug 84 or electrical lead 106.

Although those versed in the art may suggest various minor modifications, it should be understood that I wish to embody within the scope of the patent warranted hereon all such modifications as reasonably and properly come within the scope of my contribution to the art.

I claim as my invention:

1. A fitting for attaching pendent light fixtures to a conduit line comprising: a first member having means for attaching same to a conduit line; a second member having means for attaching same to a pendent light fixture; means on one of said first and said second members forming at least one elongated, laterally opening groove having an open end and a load bearing surface; and means on another one of said first and second members forming a tongue portion having a mating surface configured complementary to said load bearing surface, said tongue portion being slidably inserted into said groove with said mating surface engaging said load bearing surface for suspending the light fixture from the conduit line.

2. A fitting as defined in claim 1 and further characterized by means forming a cover selectively attached to one of said first and said second members and disposed to close said groove open end for restraining relative movement between said first and said second members when in attached position.

3. A fitting as defined in claim 1 and further characterized by:

said first member comprising a planar, rectangular body portion;

and said groove forming means comprising
a pair of depending flanges disposed along opposite, parallel side edge portions of said planar body portion, each said flange formed obliquely to a plane containing said body portion and slanting inwardly thereof,
said pair of flanges respectively lying in a pair of planes converging downwardly toward a point beneath said body portion and being equally slanted downwardly of the plane containing said body portion;
a return flange portion formed along terminal edge portions of each said depending flange and extending upwardly and outwardly thereof,
each said return flange spaced from an associated one of the pair of depending flanges and disposed parallel thereto for forming confronting, parallel wall portions defining said grooves.

4. A fitting as defined in claim 3 and further characterized by:

said second member comprising an upwardly opening channel-shaped member having a planar medial section and a spaced pair of substantially upstanding sidewalls extending transversely along opposite side edge portions of said planar medial section; and said tongue forming means disposed on said second member and comprising
a pair of flanges formed along upper terminal edge portions of said upstanding sidewalls and extending obliquely thereof and inwardly of said channel-shape member,
said pair of flanges lying along a pair of planes converging inwardly of said channel-shape member and disposed parallel to said pair of converging planes containing said depending flanges formed on said first member.

5. A fitting as defined in claim 1 and further characterized by:

said first member having a substantially planar, rectangular body portion;

said groove forming means formed on said first member and comprising
a pair of depending, offset rib portions extending transversely along opposite, parallel side edge portions of said rectangular body portion,
each said rib having a slot longitudinally cut therealong and opening laterally outwardly of said body portion
said grooves each having a sidewall forming said load bearing surface and disposed parallel to opposite ones of a pair of downwardly converging planes disposed obliquely to a plane containing said planar body portion and equally slanted downwardly therefrom.

6. A fitting as defined in claim 5 and further characterized by:
said second member comprising an upwardly opening channel-shaped member having a substantially planar medial section and a spaced pair of substantially upstanding sidewalls extending transversely along opposite side edge portions of said medial section;
said tongue forming means formed on said second member and comprising
a pair of flanges formed along upper terminal edge portions of said upstanding sidewalls and extending obliquely thereof and inwardly of said channel-shape member,
said pair of flanges disposed along opposite ones of a pair of planes converging inwardly of said channel-shaped member and disposed parallel to said planes containing said load bearing surfaces.

7. A fitting as defined in claim 1 and further characterized by:
said first member having a substantially planar body portion, and said means for attaching said first member to the conduit line comprising
a junction box; and fastening means attaching said planer body to said junction box.

8. A fitting as defined in claim 7 and further characterized by said planar body portion of said first member having a substantially centrally disposed cut out formed therethrough for receiving electrical leads extending from the junction box.

9. A fitting as defined in claim 1 and further characterized by:
said means for attaching said first member to the conduit line comprising
a hub portion disposed on said first member and having an internally threaded throughbore formed therein for receiving a complementary threaded nipple depending from the conduit line.

10. A fitting as defined in claim 1 and further characterized by:
said second member comprising a channel-shaped member having a planar medial section and a spaced pair of upstanding sidewalls disposed at opposite side edge portions of said medial section;
said means for attaching said second member to the pendent light fixture comprising
said medial section having an aperture formed therethrough, and a hub fixedly received in said aperture and having an internally threaded throughbore formed therein for receiving an upstanding, complementary threaded nipple attached to the light fixture.

11. A fitting as defined in claim 10 and further characterized by:
said hub having a radially extending flange formed thereon and overlying said medial section;
a resilient gasket interposed between said radial flange and said medial portion for absorbing vibrations; and
fastening means attaching said radial flange to said medial section and clamping said gasket therebetween.

12. A fitting as defined in claim 10 and further characterized by said hub having means forming a swivel joint.

13. A fitting as defined in claim 1 and further characterized by:
said means for attaching said second member to the pendent light fixture comprising
means forming a hook member fixedly attached to said second member and including
a shank portion depending from said second member;
said tip of said hook member being disposed relative to said electrical power receptacle so that substantially no space remains between said tip and an electrical plug whenever the latter is inserted in said receptacle.

14. A fitting for attaching pendent light fixtures to a conduit line, comprising:
first and second interconnected members, means for attaching said members respectively to a conduit line and a pendent light fixture, said members forming a wiring compartment for receiving lead wires to electrically connect the light fixture;
means on one of said members forming at least one elongated, laterally opening groove having an open end;
means on another of said members forming a tongue portion slidably inserted into said groove; and
cover means selectively attached to one of said members and disposed to close said groove open end for restraining relative movement between said members when in an attached position and to close said wiring compartment for concealing lead wires disposed therewithin.

15. A fitting as defined in claim 14,
one of said members being attachable to a conduit line and forming an opening from said wiring compartment to an interior of the conduit line; and
another of said members being attachable to a pendent light fixture and forming an opening into said wiring compartment for receiving lead wires from the light fixture.

16. A fitting as defined in claim 14,
one of said members comprising a channel shaped member having a medial portion and a pair of spaced-apart, sidewalls extending toward the other of said members and cooperating with said other member to form said wiring compartment between said members.

17. A fitting for use in attaching a high bay pendent light fixture to a conduit line comprising:
first and second parts together with one another forming said fitting;
one of said parts having coupling means for attaching said one part to a conduit line;
the other of said parts having coupling means for attaching said other of said parts to a pendent light fixture;
said first and second parts having mating tongue and groove portions formed therebetween so that the pendent light fixture with one of said parts connected thereto may be slidably connected in assembly with the conduit line having the other part connected thereto.

Disclaimer 3,598,897.—*William Castic*, Elkgrove Village, Ill. CONDUIT FITTING FOR PENDENT LIGHT FIXTURES. Patent dated Aug. 10, 1971. Disclaimer filed July 27, 1972, by the assignee, *Harvey Hubbell Incorporated*.

Hereby enters this disclaimer to claims 1, 2, 7, 8, 9, 10, 14, 15, 16 and 17 of said patent.

[*Official Gazette November 14, 1972.*]

UNITED STATES PATENT OFFICE
CERTIFICATE OF CORRECTION

Patent No. 3,598,897        Dated August 10, 1971

Inventor(s) William Castic

It is certified that error appears in the above-identified patent and that said Letters Patent are hereby corrected as shown below:

Col. 1, line 6, change "1" to --electrical--.
Col. 3, lines 64 & 65, between "39" and "are" insert --disposed along upper terminal edge portions as at 41 of the upstanding sidewalls 38, 38. The pair of inturned flanges 39, 39--; lines 71 & 72, delete "27 and the return flanges 28 so that the tongue forming flanges".
Col. 4, line 18, after "fixture" insert --while the lead wires are spliced or detaching the light fixture--; line 23, change "is" to --as--; line 55, change "it" to --at--; line 74, change "and" to --ceiling--.
Col. 7, line 25, change "planer" to --planar--.
Col. 8, line 11, after the comma insert --and--; between lines 11 & 12, insert: --an upwardly opening hook portion having an upstanding tip; and an electrical power receptacle attached to said second member;--.

Signed and sealed this 26th day of November 1974.

(SEAL)
Attest:

McCOY M. GIBSON JR.
Attesting Officer

C. MARSHALL DANN
Commissioner of Patents